US012634374B2

(12) United States Patent (10) Patent No.: US 12,634,374 B2
Xu (45) Date of Patent: May 19, 2026

(54) TRAFFIC INFLUENCE FOR INITIAL EAS SELECTION

(71) Applicant: Telefonaktiebolaget LM Ericsson (publ), Stockholm (SE)

(72) Inventor: Wenliang Xu, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 43 days.

(21) Appl. No.: 18/708,589

(22) PCT Filed: Sep. 22, 2022

(86) PCT No.: PCT/CN2022/120473
§ 371 (c)(1),
(2) Date: May 8, 2024

(87) PCT Pub. No.: WO2023/082856
PCT Pub. Date: May 19, 2023

(65) Prior Publication Data
US 2025/0023954 A1 Jan. 16, 2025

(30) Foreign Application Priority Data
Nov. 9, 2021 (WO) ................ PCT/CN2021/129598

(51) Int. Cl.
*H04L 67/51* (2022.01)
(52) U.S. Cl.
CPC .................................... *H04L 67/51* (2022.05)
(58) Field of Classification Search
None
See application file for complete search history.

(56) References Cited

U.S. PATENT DOCUMENTS

2024/0056906 A1* 2/2024 Xu .......................... H04L 67/34
2024/0121672 A1* 4/2024 Ge ........................ H04L 67/148

FOREIGN PATENT DOCUMENTS

WO WO-2021078936 A1 * 4/2021 .......... H04L 61/4511

OTHER PUBLICATIONS

International Preliminary Report on Patentability, App. No. PCT/CN2022/120473, May 23, 2024, 6 pages.
(Continued)

*Primary Examiner* — Lance Leonard Barry
(74) *Attorney, Agent, or Firm* — Nicholson De Vos Webster & Elliott LLP

(57) ABSTRACT

A method performed by a User Equipment having a first functional component implementing an enabler function. The method comprises performing an Edge Application Server (EAS) discovery to discover information regarding one or more first network functions implementing EASs as part of an initial service provisioning. The method further comprises selecting at least one first network function for implementing an initial EAS of the one or more first network functions, for providing service to a second functional component implementing application function in the UE. The method further comprises determining a second network function implementing Edge Enabler Server (EES) according to the selected at least one first network function as an initial EAS. The method further comprises transmitting, to the determined second network function, a message for triggering at least one of service session context handling and traffic influence. The message comprises an EAS endpoint of the selected initial EAS.

20 Claims, 7 Drawing Sheets

(56) References Cited

OTHER PUBLICATIONS

Office Action, TW App. No. 111141953, Jun. 30, 2023, 11 pages (4 pages of English Translation and 7 pages of Original Document).
International Search Report and Written Opinion, App. No. PCT/CN2022/120473, Dec. 2, 2022, 9 pages.
3GPP TS 23.558 V17.1.0, "3rd Generation Partnership Project; Technical Specification Group Services and System Aspects; Architecture for enabling Edge Applications; (Release 17)," Sep. 2021, 162 pages, 3GPP Organizational Partners.
3GPP TS 23.558 V2.2.0, "3rd Generation Partnership Project; Technical Specification Group Services and System Aspects; Architecture for enabling Edge Applications; (Release 17)," Jun. 2021, 157 pages, 3GPP Organizational Partners.
3GPP TR 23.700-98 V0.3.0, "3rd Generation Partnership Project; Technical Specification Group Services and System Aspects; Study on Enhanced architecture for enabling Edge Applications; (Release 18)," Oct. 2021, 41 pages, 3GPP Organizational Partners.
Huawei et al., "Solving EN on ACR failure," Apr. 12-20, 2021, 11 pages, 3GPP TSG-SA WG6 Meeting #42-BIS-e, S6-210900, e-meeting.
3GPP TS 23.502 V17.2.1, "3rd Generation Partnership Project; Technical Specification Group Services and System Aspects; Procedures for the 5G System (5GS); Stage 2 (Release 17)," Sep. 2021, 712 pages, 3GPP Organizational Partners.

* cited by examiner

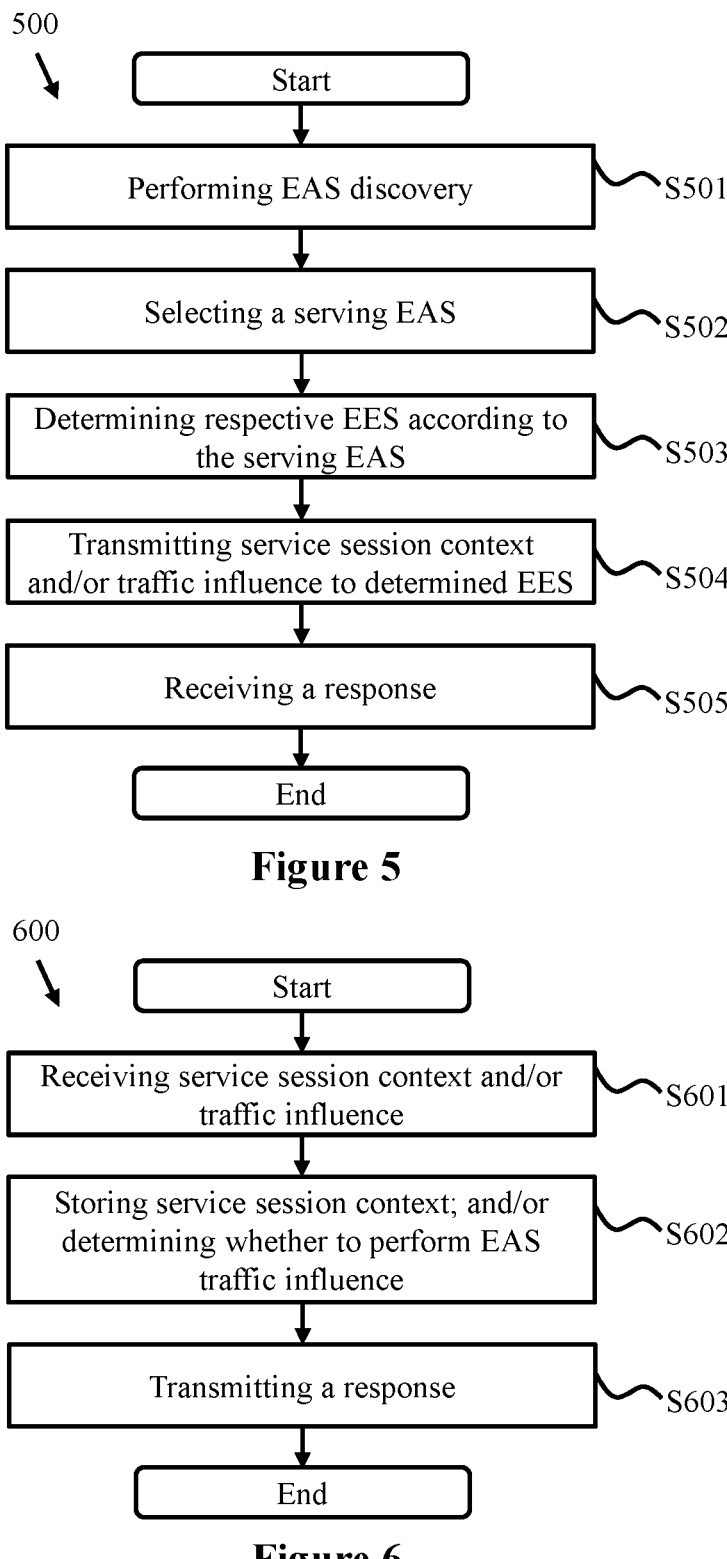

500

Start

Performing EAS discovery — S501

Selecting a serving EAS — S502

Determining respective EES according to the serving EAS — S503

Transmitting service session context and/or traffic influence to determined EES — S504

Receiving a response — S505

End

Start

Receiving service session context and/or traffic influence — S601

Storing service session context; and/or determining whether to perform EAS traffic influence — S602

Transmitting a response — S603

End

TRAFFIC INFLUENCE FOR INITIAL EAS SELECTION

CROSS-REFERENCE TO RELATED APPLICATIONS

This application is a National stage of International Application No. PCT/CN2022/120473, filed Sep. 22, 2022, which claims priority to International Application No. PCT/CN2021/129598, filed Nov. 9, 2021, which are hereby incorporated by reference.

TECHNICAL FIELD

The embodiments herein relate generally to the field of edge computing, and more particularly, the embodiments herein relate to traffic influence for initial EAS selection.

BACKGROUND

The third Generation Partnership Project (3GPP) Technical Specification (TS) 23.558 Release 17 (v17.1.0) specifies the application layer architecture, procedures and information flows necessary for enabling edge applications over 3GPP networks. It includes architectural requirements for enabling edge applications, application layer architecture fulfilling the architecture requirements and procedures to enable the deployment of edge applications.

FIG. 1 is a schematic block diagram showing example architecture 100 for enabling edge applications. The Edge Data Network (EDN) 102 is a local data network. The Edge Application Server(s) (EAS) 121 and the Edge Enabler Server (EES) 122 are contained within the EDN 102. The Edge Configuration Server (ECS) 103 provides configurations related to the EES 122, including details of the EDN 102 hosting the EES 122. The User Equipment (UE) 101 contains Application Client(s) (AC) 112 and the Edge Enabler Client (EEC) 111. The EAS(s) 121, the EES(s) 122 and the ECS 103 may interact with the 3GPP Core Network 104.

There are several unsolved key issues when discussing the next release, for example Release 18.

SUMMARY

The embodiments herein propose methods, network functions, computer readable mediums and computer program products for service session context handling and/or traffic influence for initial EAS selection.

In some embodiments, there proposes a method performed by a UE having a first functional component (such as EEC) implementing an enabler function. In an embodiment, the method may comprise the step of performing an EAS discovery to discover information regarding one or more first network functions implementing EASs as part of an initial service provisioning. In an embodiment, the method may further comprise the step of selecting at least one first network function for implementing an initial EAS of the one or more first network functions, for providing service to a second functional component implementing application function in the UE. In an embodiment, the method may further comprise the step of determining a second network function implementing EES according to the selected at least one first network function as an initial EAS. In an embodiment, the method may further comprise the step of transmitting, to the determined second network function, a message for triggering at least one of service session context handling and traffic influence. In an embodiment, the message may comprise an EAS endpoint of the selected initial EAS.

In an embodiment, the message for triggering the service session context handling may include information regarding the second functional component and information regarding the selected initial EAS.

In an embodiment, the information regarding the second functional component may further include at least one of the ID of the UE and the ID of the second functional component.

In an embodiment, the information regarding the selected initial EAS may further include an ID of the selected initial EAS.

In an embodiment, the message for triggering traffic influence may further comprises an ID of the selected initial EAS.

In an embodiment, the traffic influence may be a traffic influence between the UE and the initial EAS.

In an embodiment, selecting the first network function may further comprise the step of: providing the information regarding the one or more first network functions to the second functional component; receiving a selection including one or more first network function from the second functional component; and selecting at least one first network function according to the received selection.

In an embodiment, selecting the first network function may further comprise the step of: providing information regarding a subset of the one or more first network functions to the second functional component; receiving a selection including one or more first network function from the second functional component; and selecting at least one first network function according to the received selection.

In an embodiment, selecting the first network function may further comprise the step of receiving a delegation on the selection of the first network function from the second functional component; selecting at least one first network function; and informing the second functional component about the selected at least one first network function.

In an embodiment, the selection of the first network function may be based on at least one of preferred EAS provider and best EAS service Key Performance Indicator (KPI).

In an embodiment, the method may further comprise the step of receiving, from the determined second network function, a response to the transmitted message. In addition, the response may indicate success or failure of the traffic influence and/or service session context handling.

In an embodiment, transmitting the message to the determined second network function may further comprise the step of transmitting, to the determined second network function, an EAS declaration request message over EDGE-1 interface.

In an embodiment, receiving the response from the determined second network function may further comprise the step of receiving, from the determined second network function, an EAS declaration response message over EDGE-1 interface.

In an embodiment, performing the EAS discovery may further comprise the step of transmitting a first message to a third network function implementing ECS. In an embodiment, performing the EAS discovery may further comprise the step of receiving a second message from the third network function, including information regarding one or more second network functions. In an embodiment, performing the EAS discovery may further comprise the step of transmitting a third message to each of the one or more second network functions. In an embodiment, performing the EAS discovery may further comprise the step of receiving a fourth message from each of the one or more second network functions. In addition, the fourth message may include information regarding the one or more first network functions.

In an embodiment, the first message may be service provisioning request message and the second message may be service provisioning response message.

In an embodiment, the first message may be service provisioning subscription request message and the second message may be service provisioning notification message.

In an embodiment, the third message may be EAS discovery request message and the fourth message may be EAS discovery response message.

In an embodiment, the third message may be EAS discovery subscription request message and the fourth message may be EAS discovery notification message.

In some embodiments, there proposes a method performed by a second network function implementing EES. In an embodiment, the method may comprise the step of receiving, from a UE having a first functional component implementing an enabler function, a message for triggering at least one of service session context handling and traffic influence. In an embodiment, the method may further comprise the step of storing the information within the message for triggering service session context handling. In an embodiment, the method may further comprise the step of determining whether to perform EAS traffic influence based on the message. In an embodiment, the message may comprise an endpoint of a first network function implementing an initial EAS.

In an embodiment, the message for triggering service session context handling may include information regarding a second functional component implementing application function in the UE and information regarding the first network function implementing initial EAS.

In an embodiment, the information regarding the second functional component further may include at least one of the ID of the UE and the ID of the second functional component.

In an embodiment, the information regarding the first network function may further include an ID of the first network function.

In an embodiment, the method may further comprise the step of informing to the first network function, to perform EAS traffic influence. In an embodiment, the EAS traffic influence may be a traffic influence between the UE and the initial EAS.

In an embodiment, the method may further comprise the step of transmitting, to the first functional component, a response to received message. In addition, the response may indicate success or failure of the traffic influence. Also, the response may indicate success or failure of the service session context handling.

In an embodiment, receiving the message from the first functional component may further comprise the step of receiving, from the first functional component, an EAS declaration request message over EDGE-1 interface.

In an embodiment, transmitting the response to the first functional component may further comprise the step of transmitting, to the first functional component, an EAS declaration response message over EDGE-1 interface.

In some embodiments, there proposes a UE, comprising: at least one processor; and a non-transitory computer readable medium coupled to the at least one processor. In an embodiment, the non-transitory computer readable medium may contain instructions executable by the at least one processor, whereby the at least one processor may be configured to perform the above method. In an embodiment, the UE may be configured as the above UE.

In some embodiments, there proposes a network function, comprising: at least one processor; and a non-transitory computer readable medium coupled to the at least one processor. In an embodiment, the non-transitory computer readable medium may contain instructions executable by the at least one processor, whereby the at least one processor may be configured to perform the above method. In an embodiment, the network function may be configured as the above second network function.

In some embodiments, there proposes a computer readable medium comprising computer readable code, which when run on an apparatus, causes the apparatus to perform any of the above methods.

In some embodiments, there proposes a computer program product comprising computer readable code, which when run on an apparatus, causes the apparatus to perform any of the above methods.

The embodiments herein allow the service session management at the EES (that is determining which application uses which EAS service) and allow the EES to determine whether to perform traffic influence when initial EAS discovery is completed in the application layer.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements, and in which:

FIG. 5 is a schematic flow chart showing an example method in the UE, according to the embodiments herein;

FIG. 6 is a schematic flow chart showing an example method in the second network function, according to the embodiments herein;

DETAILED DESCRIPTION OF EMBODIMENTS

Embodiments herein will be described in detail hereinafter with reference to the accompanying drawings, in which embodiments are shown. These embodiments herein may, however, be embodied in many different forms and should not be construed as being limited to the embodiments set forth herein. The elements of the drawings are not necessarily to scale relative to each other.

Reference to "one embodiment" or "an embodiment" means that a particular feature, structure or characteristic described in connection with the embodiment is included in at least one embodiment. Thus, the appearances of the phrase "in an embodiment" appearing in various places throughout the specification are not necessarily all referring to the same embodiment.

The term "A, B, or C" used herein means "A" or "B" or "C"; the term "A, B, and C" used herein means "A" and "B" and "C"; the term "A, B, and/or C" used herein means "A", "B", "C", "A and B", "A and C", "B and C" or "A, B, and C".

The edge computing study TR 23.700-98 v0.3.0 describes several Key Issues (KIs).

KI #8 Says:

"From a different perspective, the registration procedure results in EEC context establishment at EES, with associated service session management. The EES process for determining EAS selection for service sessions is not specified, and there is no method to synchronize this information with the EEC."

KI #14 Says:

"Currently, it is not clear in the specification how to influence the application traffic with best optimal user plane routing when initial EAS discovery is completed in the application layer."

Hence it is needed to find a solution addressing those KIs in relation to traffic influence and service session management (i.e. determine which application uses which EAS service).

In view of deficiencies with the current event exposure subscription procedure, the embodiments propose a solution for communicating the service session context and traffic influence.

In an embodiment, the wireless communication system 100 may be configured in an OTT scenario. The OTT connection may be transparent in the sense that the participating communication devices through which the OTT connection passes are unaware of routing of uplink and downlink communications. For example, a base station may not or need not be informed about the past routing of an incoming downlink communication with data originating from the EAS 121, EES 122, or ECS 103 to be forwarded (e.g., handed over) to a connected UE 101. Similarly, the base station need not be aware of the future routing of an outgoing uplink communication originating from the UE 101 towards the EAS 121, EES 122, or ECS 103.

It should also be understood that, a network function can be implemented either as a network element on a dedicated hardware, as a software instance running on a dedicated hardware, or as a virtualized function instantiated on an appropriate platform, e.g. on a cloud infrastructure.

Figure 1:
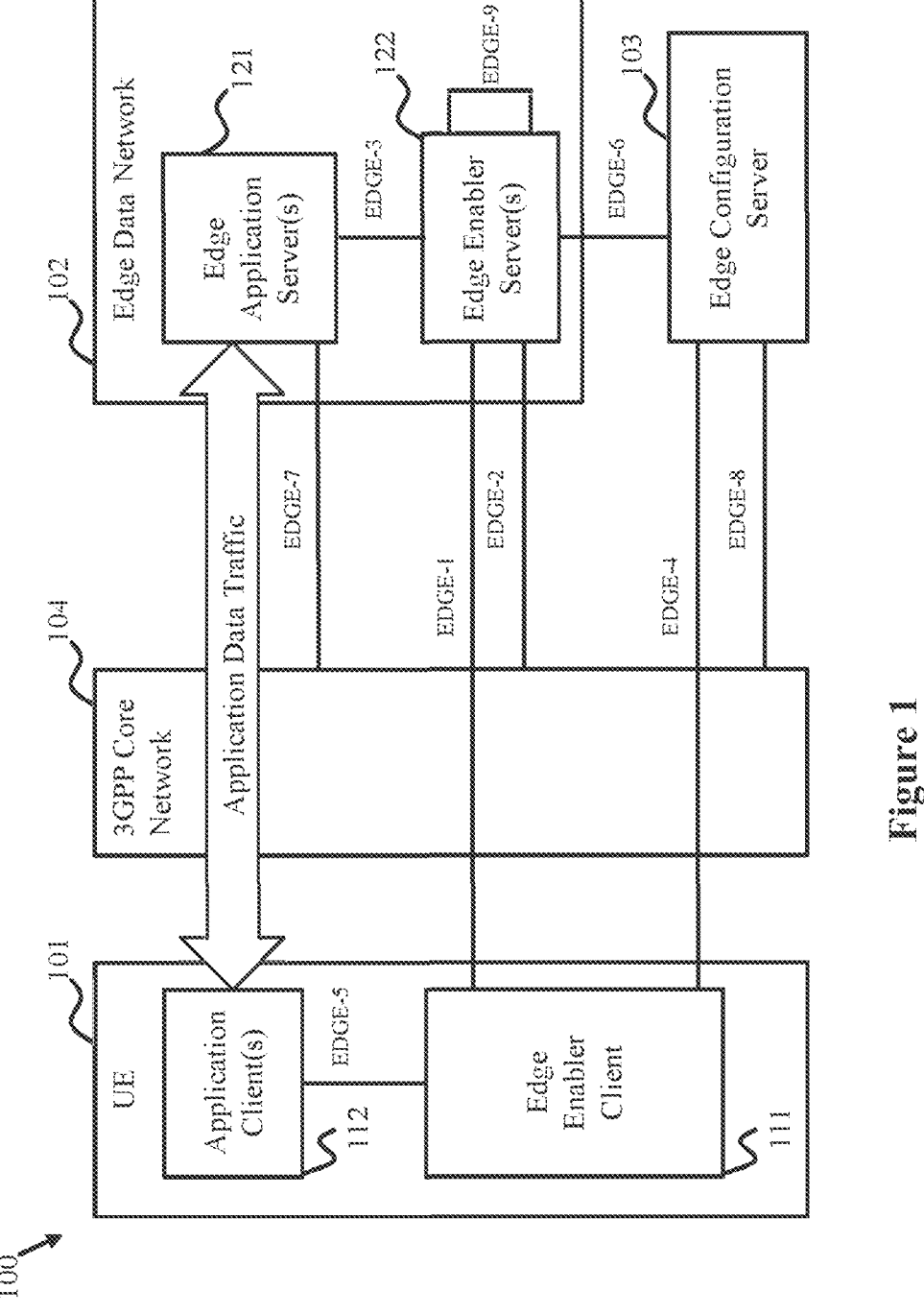
FIG. 1 is a schematic block diagram showing example architecture for enabling Edge applications.
Figure 2:
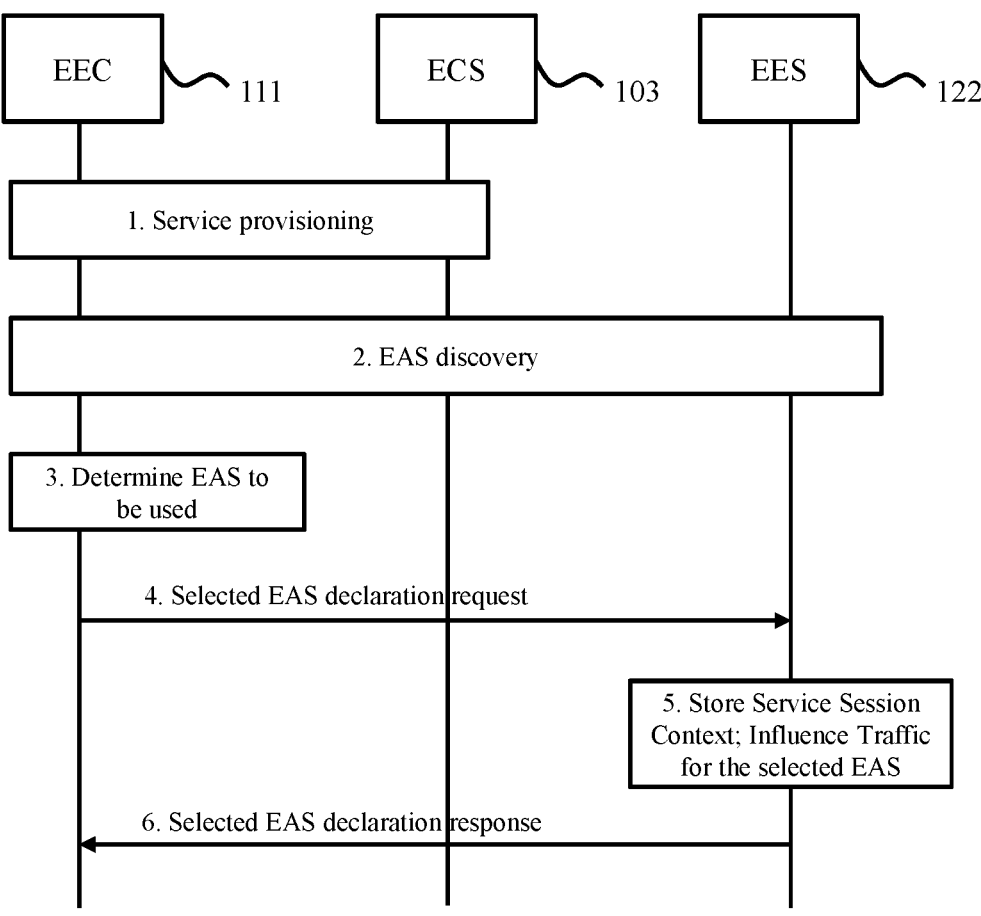
FIG. 2 is a schematic signaling chart showing the messages in a service session context and traffic influence transmission procedure, according to the embodiments herein.

FIG. 2 is a schematic signaling chart showing the messages in a service session context and traffic influence transmission procedure, according to the embodiments herein.

In an embodiment, the signaling chart may include the following messages or steps:

Step 1: The EEC 111 may perform an initial service provisioning procedure with the ECS 103. In response, the ECS 103 may provide the information (for example address/endpoint) of one or more EESs 122 to the EEC 111.

Step 2: The EEC 111 may perform an EAS discovery procedure with each of the one or more EESs 122. In response, the EESs 122 may provide the information (for example address/endpoint) of one or more EASs 121 to the EEC 111. That is, each EES 122 may provide the information (such as endpoint) of one or more EASs 121 registered thereon.

Step 3: The EEC 111 may determine (or select) EAS to be used as initial EAS. For example, the EEC 111 may select at least one EAS 121 as initial EAS from the one or more discovered EASs 121 by the following several options.

Option 1a: The EEC 111 may offer the full list of discovered EAS candidates to the AC 112, and the AC 112 may perform the EAS selection and inform EEC the selected EAS.

Option 1b: The EEC 111 may narrow down the number of discovered EAS candidates and offer the filtered (i.e., a subset of) EAS candidates to the AC 112, and the AC 112 may perform the EAS selection and inform the EEC 112 the selected EAS.

Option 2: The AC 112 may delegate the EAS selection to the EEC 111, so the EEC 111 may perform the EAS selection and also notify the AC 112 the selected EAS.

Note that the EAS selection criteria may base on at least one of the preferred EAS provider and best EAS Service KPIs.

Also, based on the determined initial EAS 121, the EEC 111 may further determine an EES 122. For example, the EES 122 on which the determined EAS 121 is registered may be determined.

Step 4: The EEC 111 may send a selected EAS declaration request message with AC ID, EAS ID, EAS endpoint and UE ID to the selected EES 122 (which is determined based on the selected initial EAS 121). In addition, the EEC 111 may also implicitly or explicitly indicate the desire to influence the EAS traffic in the request message, that is, to trigger EAS traffic influence by the EES.

The following table 1 describes information elements for the selected serving EAS declaration request sent from the EEC 111 to the serving EES 122.

TABLE 1

| Selected target EAS declaration request | | |
|---|---|---|
| Information element | Status | Description |
| UE ID | M | The identifier of the UE. |
| AC ID | O | The identifier of the Application Client |
| Security credentials | M | Security credentials. |
| Selected EAS ID | M | Selected EAS identifier. |
| Selected EAS Endpoint | M | Endpoint of the selected EAS. |
| EAS Traffic influence indication | O | Indicates whether the EES shall perform EAS traffic influence. If omitted, there is no need to perform traffic influence. |

Step 5: The EES 122 may store the service session context (so that the EES 122 may record which application uses which EAS service) and/or apply the AF traffic influence with the N6 routing information of the EAS in the 3GPP Core Network, if applicable. The details of the AF traffic influence may refer to 3GPP TS23.502, and thus is omitted here.

Step 6: The EES 122 may respond the EEC 111 by a selected EAS declaration response message with success/failure of the selected EAS declaration request message.

Note that, the impact introduced by step 4 and step 6 can utilize the existing EDGE-3 Eees_SelectedTargetEAS API with a new indication for EAS traffic influence.

The embodiments herein may allow the service session management at the EES (that is determining which application uses which EAS service) and may solve the above key issue #8.

In addition, the embodiments herein allow the EES to determine whether to perform traffic influence when initial EAS discovery is completed in the application layer, and may solve the above key issue #14.

Figure 3A:
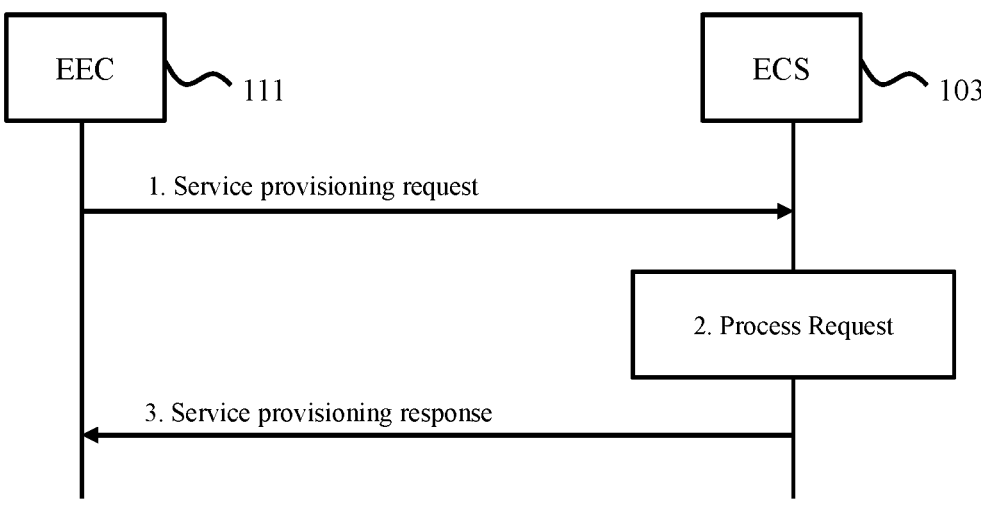
FIG. 3A is a schematic signaling chart showing the messages in a service provisioning request-response procedure.

FIG. 3A is a schematic signaling chart showing the messages in a service provisioning request-response procedure. In one embodiment, the service provisioning request-response procedure of FIG. 3A may be implemented as step 1 of FIG. 2.

In one embodiment, the messages in the service provisioning request-response procedure of FIG. 3A may be transmitted over EDGE-4 reference point, which enables interactions between the ECS 103 and the EEC 111. The EDGE-4 reference point supports: a) provisioning of Edge configuration information to the EEC.

In an embodiment, the signaling chart in FIG. 3A may include the following messages or steps:

Step 1: The EEC 111 may send a service provisioning request to the ECS 103. The service provisioning request may include the UE identifier such as Generic Public Subscription Identifier (GPSI), connectivity information, UE location and AC profile(s) information.

Step 2: Upon receiving the request, the ECS 103 may performs an authorization check to verify whether the EEC 111 has authorization to perform the operation. If AC profile(s) are provided by the EEC 111, the ECS 103 may identify the EES(s) based on the provided AC profile(s) and the UE location. When AC profiles(s) are not provided, then: if available, the ECS 103 may identify the EES(s) based on the UE-specific service information at the ECS 103 and the UE location; or the ECS 103 may identify the EES(s) by applying the Edge Computing Service Provider (ECSP) policy (e.g. based only on the UE location). The ECS 103 may also determine other information that needs to be provisioned, e.g. identification of the EDN, EDN service area, EES endpoints.

Step 3: If the processing of the request was successful, the ECS 103 may respond to the EEC's request with a service provisioning response which includes a list of EDN configuration information, e.g. identification of the EDN, EDN service area, and the required information (e.g. URI, IP address) for establishing a connection to the EES 122. The EEC 111 may cache the service provisioning information (e.g. EES endpoint) for subsequent use and avoid the need to repeat step 1.

In addition, the ECS 103 may reject the service provisioning request and respond with an appropriate failure cause.

Figure 3B:
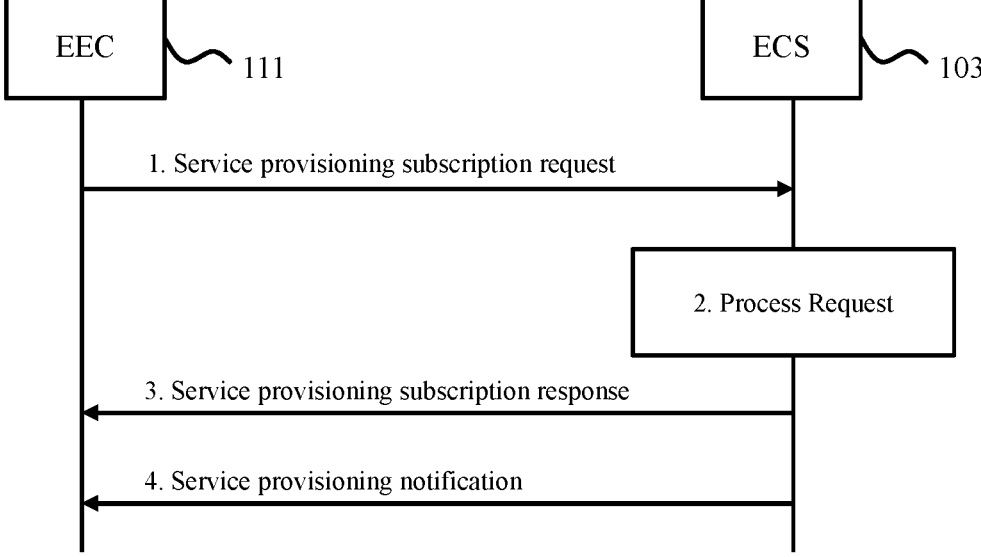
FIG. 3B is a schematic signaling chart showing the messages in a service provisioning subscription-notification procedure.

FIG. 3B is a schematic signaling chart showing the messages in a service provisioning subscription-notification procedure. In one embodiment, the service provisioning subscription-notification procedure of FIG. 3B may be implemented as step 1 of FIG. 2.

In one embodiment, the messages in the service provisioning subscription-notification procedure of FIG. 3B may be transmitted over EDGE-4 reference point, which enables interactions between the ECS 103 and the EEC 111. The EDGE-4 reference point supports: a) provisioning of Edge configuration information to the EEC.

In an embodiment, the signaling chart in FIG. 3B may include the following messages or steps:

Step 1: The EEC 111 may send a service provisioning subscription request to the ECS 103. The service provisioning subscription request may include Notification Target Address (e.g. URL) and may include the UE identifier such as GPSI, connectivity information, proposed expiration time and AC Profile information.

Step 2: Upon receiving the request, the ECS 103 may perform an authorization check to verify whether the EEC 111 has authorization to perform the operation. If required, the ECS 103 may utilize the capabilities (e.g. UE location or user plane management event notification service if available) of the 3GPP core network 104. If the request is authorized, the ECS 103 may create and store the subscription for provisioning.

Step 3: If the processing of the request was successful, the ECS 103 may respond with a service provisioning subscription response.

In addition, the ECS 103 may reject the service provisioning subscription request and respond with an appropriate failure cause.

Step 4: An event occurs at the ECS 103 that satisfies trigger conditions for updating service provisioning of a subscribed EEC 111. If AC profile(s) were provided by the EEC 111 during subscription creation, the ECS 103 identifies the EES(s) based on the provided AC profile(s) and the UE location. If AC profiles(s) were not provided, then: if available, the ECS 103 may identify the EES(s) based on the UE-specific service information at the ECS 103 and the UE location; or the ECS 103 may identify the EES(s) 122 by applying the ECSP policy (e.g. based only on the UE location). The ECS 103 also determines other information that needs to be provisioned, e.g. identification of the EDN, EDN service area, EES endpoints. Then, the ECS 103 may send a provisioning notification to the EEC 111 with the list of EDN configuration information as determined.

Figure 4A:
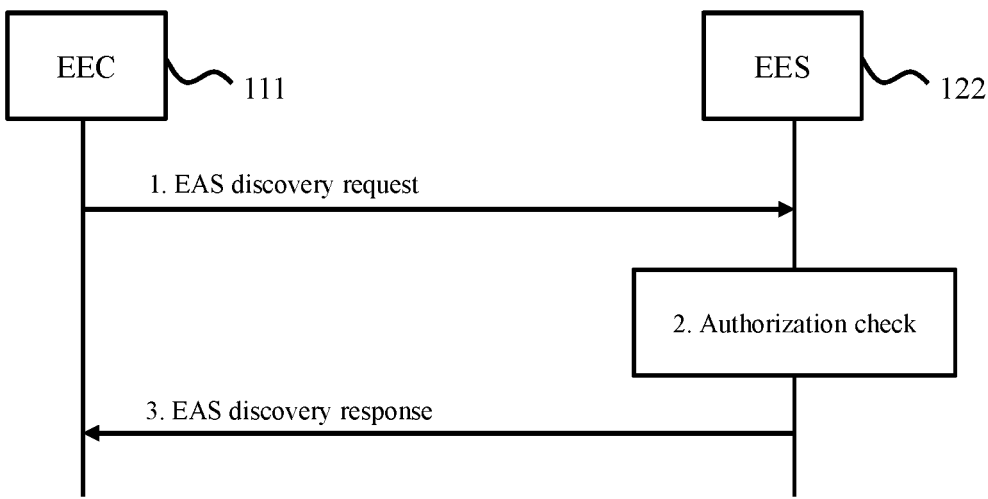
FIG. 4A is a schematic signaling chart showing the messages in an EAS discovery request-response procedure.

FIG. 4A is a schematic signaling chart showing the messages in an EAS discovery request-response procedure. In one embodiment, the EAS discovery request-response procedure of FIG. 4A may be implemented as step 2 of FIG. 2.

In one embodiment, the messages in the service provisioning request-response procedure of FIG. 4A may be transmitted over EDGE-1 reference point enables interactions between the EES 122 and the EEC 111. It supports: a) registration and de-registration of the EEC to the EES; b) retrieval and provisioning of EAS configuration information; and c) discovery of EASs available in the EDN.

In an embodiment, the signaling chart in FIG. 4A may include the following messages or steps:

Step 1: The EEC 111 may send an EAS discovery request to the EES 122. The EAS discovery request includes the requestor identifier [EECID] along with the security credentials and may include EAS discovery filters and may also include UE location to retrieve information about particular EAS(s) or a category of EASs, e.g. gaming applications, or Edge Applications Server(s) available in certain service areas, e.g. available on a UE's predicted or expected route.

Step 2: Upon receiving the request from the EEC 111, the EES 122 may check if the EEC 111 is authorized to discover the requested EAS(s). The authorization check may apply to an individual EAS, a category of EASs or to the EDN, i.e. to all the EASs. If EAS discovery filters are provided by the EEC 111, the EES 122 may identify the EAS(s) based on the provided EAS discovery filters and the UE location. When EAS discovery filters are not provided, then: if available, the EES 122 may identify the EAS(s) based on the UE-specific service information at the EES 122 and the UE location; or the EES 122 may identify the EAS(s) by applying the ECSP policy (e.g. based only on the UE location).

Step 3: If the processing of the request was successful, the EES 122 may sends an EAS discovery response to the EEC 111, which includes information about the discovered EASs. For discovered EASs, this may include endpoint information. The EAS discovery response may contain a list of EASs.

In addition, the EES 122 may reject the EAS discovery request and respond with an appropriate failure cause.

Figure 4B:
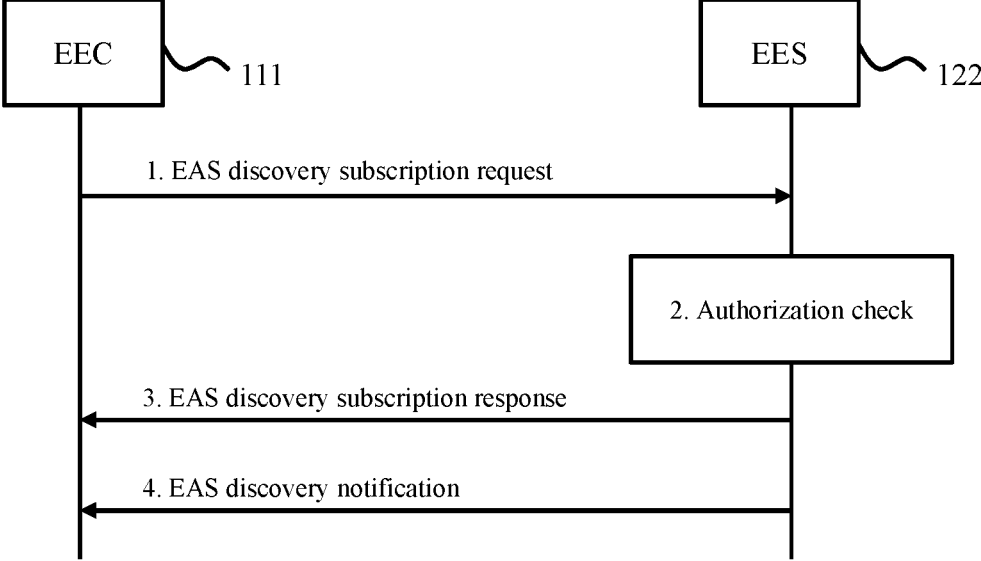
FIG. 4B is a schematic signaling chart showing the messages in an EAS discovery subscription-notification procedure.

FIG. 4B is a schematic signaling chart showing the messages in an EAS discovery subscription-notification procedure. In one embodiment, the EAS discovery subscription-notification procedure of FIG. 4B may be implemented as step 2 of FIG. 2.

In one embodiment, the messages in the service provisioning request-response procedure of FIG. 4B may be transmitted over EDGE-1 reference point enables interactions between the EES 122 and the EEC 111. It supports: a) registration and de-registration of the EEC to the EES; b) retrieval and provisioning of EAS configuration information; and c) discovery of EASs available in the EDN.

In an embodiment, the signaling chart in FIG. 4B may include the following messages or steps:

Step 1: The EEC 111 may send an EAS discovery subscription request to the EES 122. The EAS discovery subscription request includes the EECID along with the security credentials, Event ID, and may include EAS discovery filters and EAS dynamic information filters to subscribe to information about particular EAS(s) or a category of EASs (e.g. gaming applications) or dynamic information about EAS(s).

Step 2: Upon receiving the request from the EEC 111, the EES 122 may check if the EEC 111 is authorized to subscribe for information of the requested EAS(s). The authorization check may apply to an individual EAS, a category of EASs or to the EDN, i.e. to all the EASs. If the request is authorized, the EES 111 creates and stores the subscription for EAS discovery.

Step 3: If the processing of the request was successful, the EES 122 may send an EAS discovery subscription response to the EEC 111.

In addition, the EES 122 may reject the EAS discovery subscription request and respond with an appropriate failure cause.

Step 4: An event occurs at the EES 122 that satisfies trigger conditions for notifying (e.g. to provide EAS discovery information or EAS dynamic information) a subscribed EEC.

If EAS discovery filters are provided by the EEC 111 during subscription creation, the EES 122 may identify the EAS(s) based on the provided EAS discovery filters and the UE location. If EAS discovery filters were not provided, then: if available, the EES 122 may identify the EAS(s) based on the UE-specific service information at the EES 122 and the UE location; or the EES 122 may identify the EAS(s) by applying the ECSP policy (e.g. based only on the UE location). Then, the EES 122 may send an EAS discovery notification to the EEC 111 with the EAS information as determined.

FIG. 5 is a schematic flow chart showing an example method 500 in the UE, according to the embodiments herein. In an embodiment, the flow chart in FIG. 5 may be implemented in the first functional component (such as EEC 111 in FIGS. 1-4B) of the UE 101.

The method 500 may begin with step S501, in which the first functional component (such as EEC 111) of the UE 101 may perform an EAS discovery to discover information regarding one or more first network functions implementing EASs (such as EAS(s) 121) as part of an initial service provisioning, as shown in FIG. 3A, FIG. 3B, FIG. 4A and FIG. 4B.

In an embodiment, performing the EAS discovery may further comprise the step of transmitting a first message to a third network function implementing ECS (such as the ECS 103), as shown in Step 1 of FIG. 3A and FIG. 3B.

In an embodiment, performing the EAS discovery may further comprise the step of receiving a second message from the third network function (such as the ECS 103), including information regarding one or more second network functions (such as the EES(s) 122), as shown in Step 3 of FIG. 3A and Step 4 of FIG. 3B.

In an embodiment, performing the EAS discovery may further comprise the step of transmitting a third message to each of the one or more second network functions (such as the EES(s) 122), as shown in Step 1 of FIG. 4A and FIG. 4B.

In an embodiment, performing the EAS discovery may further comprise the step of receiving a fourth message from each of the one or more second network functions (such as the EES(s) 122), as shown in Step 3 of FIG. 4A and Step 4 of FIG. 4B. In addition, the fourth message may include information (such as EAS endpoint) regarding the one or more first network functions (such as the EAS(s) 121).

In an embodiment, the first message may be service provisioning request message and the second message may be service provisioning response message, as shown in FIG. 3A.

In an embodiment, the first message may be service provisioning subscription request message and the second message may be service provisioning notification message, as shown in FIG. 3B.

In an embodiment, the third message may be EAS discovery request message and the fourth message may be EAS discovery response message, as shown in FIG. 4A.

In an embodiment, the third message may be EAS discovery subscription request message and the fourth message may be EAS discovery notification message, as shown in FIG. 4B.

Then, the method 500 may proceed to step S502, in which the first functional component (such as EEC 111) of the UE 101 may select at least one first network function for implementing an initial EAS of the one or more first network functions, for providing service to a second functional component implementing application function (such as AC 112) in the UE 101.

In an embodiment, selecting the first network function may further comprise the step of: providing the information regarding the one or more first network functions to the second functional component; receiving a selection including one or more first network function from the second functional component; and selecting at least one first network function according to the received selection.

In an embodiment, selecting the first network function may further comprise the step of: providing information regarding a subset of the one or more first network functions to the second functional component; receiving a selection including one or more first network function from the second functional component; and selecting at least one first network function according to the received selection.

In an embodiment, selecting the first network function may further comprise the step of receiving a delegation on the selection of the first network function from the second functional component; selecting at least one first network function; and informing the second functional component about the selected at least one first network function.

In an embodiment, the selection of the first network function may be based on at least one of preferred EAS provider and best EAS service KPI.

Then, the method 500 may proceed to step S503, in which the first functional component (such as EEC 111) of the UE 101 may determine a second network function implementing EES according to the selected at least one first network function as the initial EAS.

Then, the method 500 may proceed to step S504, in which the first functional component (such as EEC 111) of the UE 101 may transmit, to the determined second network function, a message for triggering at least one of service session context handling and traffic influence. In an embodiment, the message may comprise an EAS endpoint of the selected initial EAS.

In an embodiment, the message for triggering the service session context handling may include information regarding the second functional component and information regarding the selected initial EAS.

In an embodiment, the information regarding the second functional component may further include at least one of the ID of the UE and the ID of the second functional component.

In an embodiment, the information regarding the selected initial EAS may further include an ID of the selected initial EAS.

In an embodiment, the message for triggering traffic influence may further comprise an ID of the selected initial EAS. In an embodiment, the traffic influence may be a traffic influence between the UE and the initial EAS.

In an embodiment, transmitting the message to the determined second network function may further comprise the step of transmitting, to the determined second network function, an EAS declaration request message over EDGE-1 interface.

Then, the method 500 may proceed to step S505, in which the first functional component (such as EEC 111) of the UE 101 may receive, from the determined second network function, a response to the transmitted message. In addition, the response may indicate success or failure of the traffic influence and/or service session context handling.

In an embodiment, receiving the response from the determined second network function may further comprise the step of receiving, from the determined second network function, an EAS declaration response message over EDGE-1 interface.

The above steps are only examples, and the first functional component of the UE 101 may perform any actions described with respect to FIG. 1-FIG. 4B.

FIG. 6 is a schematic flow chart showing an example method 600 in the second network function, according to the embodiments herein. In an embodiment, the flow chart in FIG. 6 may be implemented in the second network function (such as EES 122) in FIG. 1-FIG. 4B.

The method 600 may begin with step S601, in which the second network function (such as EES 122) may receive, from a UE 101 having a first functional component (such as the EEC 111) implementing an enabler function, a message for triggering at least one of service session context handling and traffic influence. In an embodiment, the message may comprise an endpoint of a first network function implementing an initial EAS.

In an embodiment, the message for triggering service session context handling may include information regarding a second functional component implementing application function in the UE and information regarding the first network function implementing initial EAS.

In an embodiment, the information regarding the second functional component further may include at least one of the ID of the UE and the ID of the second functional component.

In an embodiment, the information regarding the first network function further may include an ID of the first network function.

In an embodiment, receiving the message from the first functional component may further comprise the step of receiving, from the first functional component, an EAS declaration request message over EDGE-1 interface.

Then, the method 600 may proceed to step S602, in which the second network function (such as EES 122) may store the indication indicating service session context. In addition or alternatively, the second network function (such as EES 122) may determine whether to perform EAS traffic influence based on the message.

In addition, in an embodiment, when the second network function determine to perform EAS traffic influence, the method may further comprise the step (not shown) of informing to the first network function, to perform EAS traffic influence. In an embodiment, the traffic influence may be a traffic influence between the UE and the initial EAS.

Then, the method 600 may proceed to step S603, in which the second network function (such as EES 122) may transmit, to the first functional component of the UE 101, a response to received message. In addition, the response may indicate success or failure of the traffic influence. Also, the response may indicate success or failure of the service session context handling.

In an embodiment, transmitting the response to the first functional component may further comprise the step of transmitting, to the first functional component, an EAS declaration response message over EDGE-1 interface.

The above steps are only examples, and the second network function may perform any actions described with respect to FIG. 1-FIG. 4B.

Figure 7:
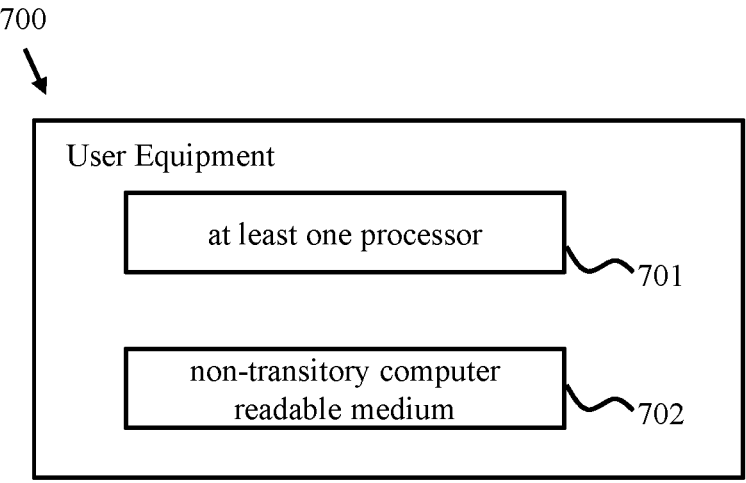
FIG. 7 is a schematic block diagram showing an example UE, according to the embodiments herein.

FIG. 7 is a schematic block diagram showing an example UE, according to the embodiments herein.

In an embodiment, the UE 700 may include at least one processor 701; and a non-transitory computer readable medium 702 coupled to the at least one processor 701. The non-transitory computer readable medium 702 contains instructions executable by the at least one processor 701, whereby the at least one processor 701 is configured to perform the steps in the example method 500 as shown in the schematic flow chart of FIG. 5; the details thereof are omitted here.

Note that, the UE 700 may be implemented as hardware, software, firmware and any combination thereof. For example, the UE 700 may include a plurality of units, circuities, modules or the like, each of which may be used to perform one or more steps of the example method 500 or one or more steps shown in FIG. 1-FIG. 4B related to the UE 101 and its functional component (such as EEC 111 and/or AC 112).

Figure 8:
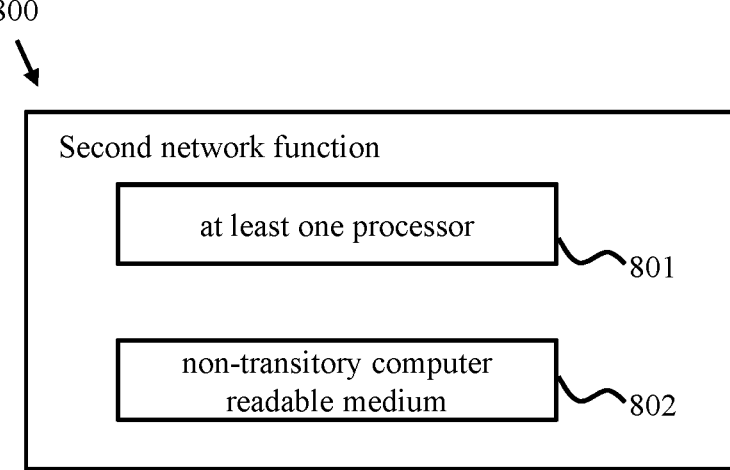
FIG. 8 is a schematic block diagram showing an example second network function, according to the embodiments herein.

FIG. 8 is a schematic block diagram showing an example second network function (such as the EES(s) 122), according to the embodiments herein.

In an embodiment, the second network function 800 may include at least one processor 801; and a non-transitory computer readable medium 802 coupled to the at least one processor 801. The non-transitory computer readable medium 802 contains instructions executable by the at least one processor 801, whereby the at least one processor 801 is configured to perform the steps in the example method

600 as shown in the schematic flow chart of FIG. 6; the details thereof are omitted here.

Note that, the second network function 800 may be implemented as hardware, software, firmware and any combination thereof. For example, the second network function 800 may include a plurality of units, circuities, modules or the like, each of which may be used to perform one or more steps of the example method 600 or one or more steps shown in FIG. 1-FIG. 4B related to the second network function (such as the EES(s) 122).

It should be understood that, the second network function may be implemented either as a network element on a dedicated hardware, as a software instance running on a dedicated hardware, or as a virtualized function instantiated on an appropriate platform, e.g. on a cloud infrastructure.

Figure 9:
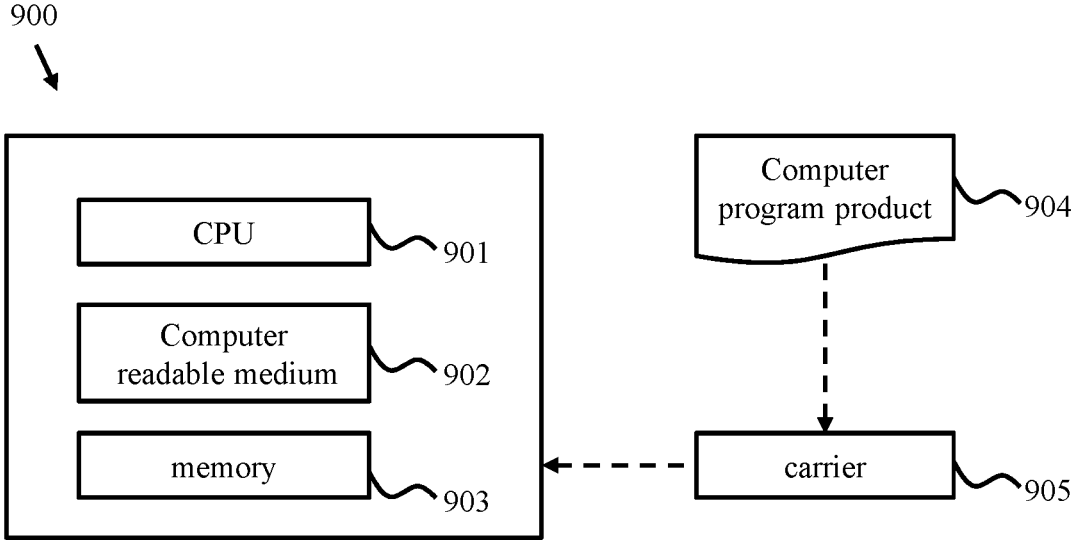
FIG. 9 is a schematic block diagram showing an example computer-implemented apparatus, according to the embodiments herein.

FIG. 9 is a schematic block diagram showing an example computer-implemented apparatus 900, according to the embodiments herein. In an embodiment, the apparatus 900 may be configured as the above mentioned apparatus, such as the UE 101 and its functional component (such as EEC 111 and/or AC 112), the first network function (such as the EAS(s) 121), the second network function (such as the EES(s) 122), or the third network function (such as the ECS 103).

In an embodiment, the apparatus 900 may include but not limited to at least one processor such as Central Processing Unit (CPU) 901, a computer-readable medium 902, and a memory 903. The memory 903 may comprise a volatile (e.g., Random Access Memory, RAM) and/or non-volatile memory (e.g., a hard disk or flash memory). In an embodiment, the computer-readable medium 902 may be configured to store a computer program and/or instructions, which, when executed by the processor 901, causes the processor 901 to carry out any of the above mentioned methods.

In an embodiment, the computer-readable medium 902 (such as non-transitory computer readable medium) may be stored in the memory 903. In another embodiment, the computer program may be stored in a remote location for example computer program product 904 (also may be embodied as computer-readable medium), and accessible by the processor 901 via for example carrier 905.

The computer-readable medium 902 and/or the computer program product 904 may be distributed and/or stored on a removable computer-readable medium, e.g. diskette, CD (Compact Disk), DVD (Digital Video Disk), flash or similar removable memory media (e.g. compact flash, SD (secure digital), memory stick, mini SD card, MMC multimedia card, smart media), HD-DVD (High Definition DVD), or Blu-ray DVD, USB (Universal Serial Bus) based removable memory media, magnetic tape media, optical storage media, magneto-optical media, bubble memory, or distributed as a propagated signal via a network (e.g. Ethernet, ATM, ISDN, PSTN, X.25, Internet, Local Area Network (LAN), or similar networks capable of transporting data packets to the infrastructure node).

Furthermore, the following amendments are proposed to amend the current 3GPP Technical Study 3GPP TR 23.700-98 v0.3.0 (2021 October).

Title: Traffic influence in initial EAS selection
Reason for Change:

This pCR proposes a new solution allowing the EEC to indicate the selected EAS and desire to influence EAS traffic to the EES, during the initial EAS discovery and selection.
Proposed Changes:

*1st Change* (the proposed change includes the following the content to be added to the 3GPP Technical Study 23.700-98)

7.x Solution #XX: Traffic influence in initial EAS selection 7.x.1 Architecture enhancements None.

7.x.2 Solution description

This solution addresses KI #8 and KI #14. In this solution, the EES can know the selected EAS and the EEC is enabled to trigger the EAS traffic influence after initial EAS is being determined.

Figure (notes: referring to the above FIG. 2): EAS traffic influence for initial EAS In Figure, step 1 and 2, the EEC performs the start-up procedures for initial service provisioning and EAS discovery. EEC may send EAS discovery to multiple EESs. In step 3, the EEC (or AC and EEC) selects the initial EAS from the discovered EAS candidates. In step 4, the EEC sends Selected EAS declaration request with AC ID, EAS ID, EAS endpoint and UE ID to the selected EES (which is determined based on the selected EAS). In addition, the EEC also indicates the desire to influence the EAS traffic in the request message. The EES, in step 5, stores the service session context and apply the AF traffic influence with the N6 routing information of the EAS in the 3GPP Core Network, if applicable. The EEC is then responded by the selected EES with success/failure of the request in step 6.

NOTE: The AC is not depicted in above figure and solution to address interaction between AC and EEC is related to KI #4 for step 1 to 3.

The impact introduced by step 4 and 6 can utilize the existing EDGE-3 Eees_SelectedTargetEAS API with a new indication for EAS traffic influence.

Table 7.x.2.1-1 describes information elements for the selected serving EAS declaration request sent from the EEC to the serving EES.

TABLE 7.x.2.1-1

| Selected target EAS declaration request | | |
| --- | --- | --- |
| Information element | Status | Description |
| UE ID | M | The identifier of the UE. |
| AC ID | O | The identifier of the Application Client |
| Security credentials | M | Security credentials. |
| Selected EAS ID | M | Selected EAS identifier. |
| Selected EAS Endpoint | M | Endpoint of the selected EAS. |
| EAS Traffic influence indication | O | Indicates whether the EES shall perform EAS traffic influence. If omitted, there is no need to perform traffic influence. |

7.x.3 Solution evaluation

This clause provides an evaluation of the solution.

*End of Changes*

Example embodiments are described herein with reference to block diagrams and/or flowchart illustrations of computer-implemented methods, apparatus (systems and/or devices) and/or non-transitory computer program products. It is understood that a block of the block diagrams and/or flowchart illustrations, and combinations of blocks in the block diagrams and/or flowchart illustrations, may be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that may direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "cir-cuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

ABBREVIATIONS

3GPP 3rd Generation Partnership Project
AC Application Client
EAS Edge Application Server
ECS Edge Configuration Server
ECSP Edge Computing Service Provider
EDN Edge Data Network
EEC Edge Enabler Client
EES Edge Enabler Server
GPSI Generic Public Subscription Identifier OTT Over The Top
UE User Equipment.

What is claimed is:

1. A method performed by a User Equipment (UE), having a first functional component implementing an enabler function, the method comprises:

performing an Edge Application Server (EAS) discovery to discover information regarding one or more first network functions implementing EASs as part of an initial service provisioning;

selecting at least one first network function for implementing an initial EAS of the one or more first network functions, for providing service to a second functional component implementing application function in the UE;

determining a second network function implementing Edge Enabler Server (EES) according to the selected at least one first network function as an initial EAS;

transmitting, to the determined second network function, a message for triggering at least one of service session context handling and traffic influence, wherein the message comprises an EAS endpoint of the selected initial EAS; and transferring application data traffic, based on the at least one of service session context handling and traffic influence, between the EAS endpoint and the application function in the UE via a third Generation Partnership Project (3GPP) network.

2. The method according to claim 1, wherein the message for triggering the service session context handling includes information regarding the second functional component and information regarding the selected initial EAS.

3. The method according to claim 2, wherein the information regarding the second functional component further includes at least one ID of the UE and an ID of the second functional component; and wherein the information regarding the selected initial EAS further includes an ID of the selected initial EAS.

4. The method according to claim 1, wherein the message for triggering traffic influence further comprises an ID of the selected initial EAS.

5. The method according to claim 1, wherein the traffic influence is a traffic influence between the UE and the initial EAS.

6. The method according to claim 1, wherein selecting the first network function further comprising:

providing the information regarding the one or more first network functions to the second functional component;

receiving a selection including one or more first network function from the second functional component; and selecting at least one first network function according to the received selection.

7. The method according to claim 1, wherein selecting the first network function further comprising:

providing information regarding a subset of the one or more first network functions to the second functional component;

receiving a selection including one or more first network function from the second functional component; and selecting at least one first network function according to the received selection.

8. The method according to claim 1, wherein selecting the first network function further comprising:

receiving a delegation on the selection of the first network function from the second functional component;

selecting at least one first network function; and informing the second functional component about the selected at least one first network function.

9. The method according to claim 6, wherein the selection of the first network function is based on at least one of preferred EAS provider and best EAS service Key Performance Indicator (KPI).

10. The method according to claim 1, further comprising:

receiving, from the determined second network function, a response to the transmitted message, wherein the response indicates success or failure of the traffic influence, service session context handling, or the success or failure of the traffic influence and the service session context handling.

11. The method according to claim 10, wherein transmitting the message to the determined second network function further comprising:

transmitting, to the determined second network function, an EAS declaration request message over EDGE-1 interface;

wherein receiving the response from the determined second network function further comprising:

receiving, from the determined second network function, an EAS declaration response message over EDGE-1 interface.

12. The method according to claim 1, wherein performing the EAS discovery further comprising:

transmitting a first message to a third network function implementing Edge Configuration Server (ECS);

receiving a second message from the third network function, including information regarding one or more second network functions;

transmitting a third message to each of the one or more second network functions; and receiving a fourth message from each of the one or more second network functions, wherein the fourth message includes information regarding the one or more first network functions.

13. The method according to claim 12, wherein the first message is service provisioning request message and the second message is service provisioning response message; wherein the first message is service provisioning subscription request message and the second message is service provisioning notification message; or wherein the first message is service provisioning request message and the second message is service provisioning response message, and the first message is service provisioning subscription request message and the second message is service provisioning notification message.

14. The method according to claim 12, wherein the third message is EAS discovery request message and the fourth message is EAS discovery response message; wherein the third message is EAS discovery subscription request message and the fourth message is EAS discovery notification message; or wherein the third message is EAS discovery request message and the fourth message is EAS discovery response message, and the third message is EAS discovery subscription request message and the fourth message is EAS discovery notification message.

15. A method performed by a second network function implementing Edge Enabler Server (EES), comprising:

receiving, from a User Equipment (UE) having a first functional component implementing an enabler function, a message for triggering at least one of service session context handling and traffic influence;

determining whether to perform Edge Application Server (EAS) traffic influence based on the message, wherein the message comprises an endpoint of a first network function implementing an initial Edge Application Server (EAS); and transferring application data traffic, based on the at least one of service session context handling and traffic influence, between the endpoint and an application function in the UE via a third Generation Partnership Project (3GPP) network.

16. The method according to claim 15, wherein the message for triggering service session context handling includes information regarding a second functional component implementing application function in the UE and information regarding the first network function implementing initial EAS.

17. The method according to claim 16, wherein the information regarding the second functional component further includes at least one ID of the UE and an ID of the second functional component; and wherein the information regarding the first network function further includes an ID of the first network function.

18. The method according to claim 16, further comprising:

informing, to the first network function, to perform EAS traffic influence, wherein the EAS traffic influence is a traffic influence between the UE and the initial EAS.

19. The method according to claim 16, further comprising:

storing the information included within the message for triggering service session context handling; or transmitting, to the first functional component, a response to received message, wherein the response indicates success or failure of the traffic influence, service session context handling, or the success or failure of the traffic influence and the service session context handling.

20. A User Equipment (UE), comprising:

at least one processor; and a computer readable storage medium coupled to the at least one processor, the computer readable storage medium containing instructions, which instructions when executed by the at least one processor, cause the UE to:

perform an Edge Application Server (EAS) discovery to discover information regarding one or more first network functions implementing EASs as part of an initial service provisioning;

select at least one first network function for implementing an initial EAS of the one or more first network functions, for providing service to a second functional component implementing application function in the UE;

determine a second network function implementing Edge Enabler Server (EES) according to the selected at least one first network function as an initial EAS;

transmit, to the determined second network function, a message for triggering at least one of service session context handling and traffic influence, wherein the message comprises an EAS endpoint of the selected initial EAS; and transfer application data traffic, based on the at least one of service session context handling and traffic influence, between the EAS endpoint and the application function in the UE via a third Generation Partnership Project (3GPP) network.

* * * * *